United States Patent [19]

Fairchild et al.

[11] 4,179,738

[45] Dec. 18, 1979

[54] PROGRAMMABLE CONTROL LATCH MECHANISM FOR A DATA PROCESSING SYSTEM

[75] Inventors: Peter T. Fairchild; Joel C. Leininger, both of Boca Raton, Fla.

[73] Assignee: International Business Machines Corporation, Armonk, N.Y.

[21] Appl. No.: 918,223

[22] Filed: Jun. 23, 1978

[51] Int. Cl.² ............................................ G06F 1/00
[52] U.S. Cl. .................................................. 364/200
[58] Field of Search ... 364/200 MS File, 900 MS File

[56] References Cited

U.S. PATENT DOCUMENTS

| 3,292,151 | 12/1966 | Barnes et al. | 364/200 |
| 4,037,211 | 7/1977 | Ikuta et al. | 364/200 |

*Primary Examiner*—Raulfe B. Zache
*Attorney, Agent, or Firm*—Richard E. Bee

[57] ABSTRACT

A programmable control latch mechanism which is particularly useful in a microprocessor. One or more control latches are provided which can be set or reset under direct program control directly from the instruction register of a data processor by the loading therein of a unique program instruction. The unique instruction includes for each control latch two predetermined bit positions, one of which determines whether or not the control latch is to be changed and the other of which determines the binary value to which the control latch is to be changed. This enables anywhere from one to all of the control latches to be changed by a single instruction and enables each latch which is changed to be changed to any desired binary value. The control latch outputs can be used for storage page selection, direct control of external devices or circuits, selection of internal processor functions and the like.

5 Claims, 7 Drawing Figures

PROGRAMMABLE CONTROL LATCH MECHANISM FOR A DATA PROCESSING SYSTEM

BACKGROUND OF THE INVENTION

This invention relates to control mechanisms and storage addressing mechanisms for digital computer systems and digital data processing systems and, while not limited thereto, is particularly useful for microprocessors, microcontrollers and the like.

Microprocessors are comprised of one or two or a few Large Scale Integration (LSI) integrated circuit semiconductor chips. The normal objective is to cram everything onto as few chips as is possible. Because of the space limitations and the compromises that must be made to get as much as possible onto a single chip, microprocessors typically have somewhat limited capabilities as to the amount of storage that can be addressed and the number of independent internal and external control functions and selection functions which can be provided. It is a purpose of this invention to provide a mechanism for alleviating some of these limitations in an efficient and flexible manner and with a minimum of added circuitry on the chip.

A good example of the problem being considered is the storage addressing capability of a microprocessor. As with all processors, a decision has to be made as to the number of instruction bits that will be alloted for storage addressing purposes. The larger the number of address bits, the greater the amount of storage that can be addressed. However, the larger the number of address bits, the greater is the amount of circuitry that must be provided for addressing purposes. Thus, for the case of microprocessors, the choice is usually made to use a storage address having a relatively small number of bits as compared to previous practices with larger size processors. A more or less typical choice is to use a twelve bit storage address. This allows for the direct addressing of up to 4096 storage locations. This is not a very large amount of storage and, in many applications, it would be desirable to provide the microprocessor with a much larger storage capability.

It is a purpose of the present invention to provide a new and improved control mechanism which can be used, if desired, to extend the storage addressing range of a microprocessor beyond that which is addressable by the storage address in the program instructions, that is, by the storage address length (number of address bits) used in the various program instructions which include a storage address field. With this mechanism, the storage addressing range can be increased by a multiple of 2, 4, 8, or 16 with a minimal amount of added circuitry and with very little impact on the performance of the microprocessor.

Although the physical space limitations are not as stringent, it is believed that the present invention can also be used to good advantge in larger scale data processors for accomplishing various control functions in a more economical and efficient manner.

SUMMARY OF THE INVENTION

In accordance with the invention, there is provided a programmable control latch mechanism for use in a data processing system which includes various data flow elements for handling data signals, a storage unit for storing instructions, an instruction register for receiving stored instructions from the storage unit and control circuitry coupled to the instruction register for controlling the data flow elements and the reading of instructions from the storage unit. The programmable control latch mechanism includes one or more latch circuits, each having a data input for receiving a binary data signal, a load input for receiving a load signal for causing the binary data signal to be loaded into the latch circuit, and at least one output for providing a control signal for the data processing system. The programmable control latch mechanism also includes circuitry for coupling the data inputs of the latch circuits to different ones of a first set of bit positions of the instruction register. The programmable control latch mechanism further includes decoder circuitry coupled to the instruction register for detecting the occurrence therein of an instruction having a predetermined operation code. The programmable control latch mechanism also includes one or more logic circuits having first inputs coupled to different ones of a second set of bit positions of the instruction register, second inputs coupled to the decoder circuitry and outputs coupled to the load inputs of different ones of the latch circuits for enabling the instruction register bit positions in the second set to determine which latch circuits are loaded when the predetermined operation code is detected.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings.

DESCRIPTION OF THE ILLUSTRATED EMBODIMENT

Figure 1:
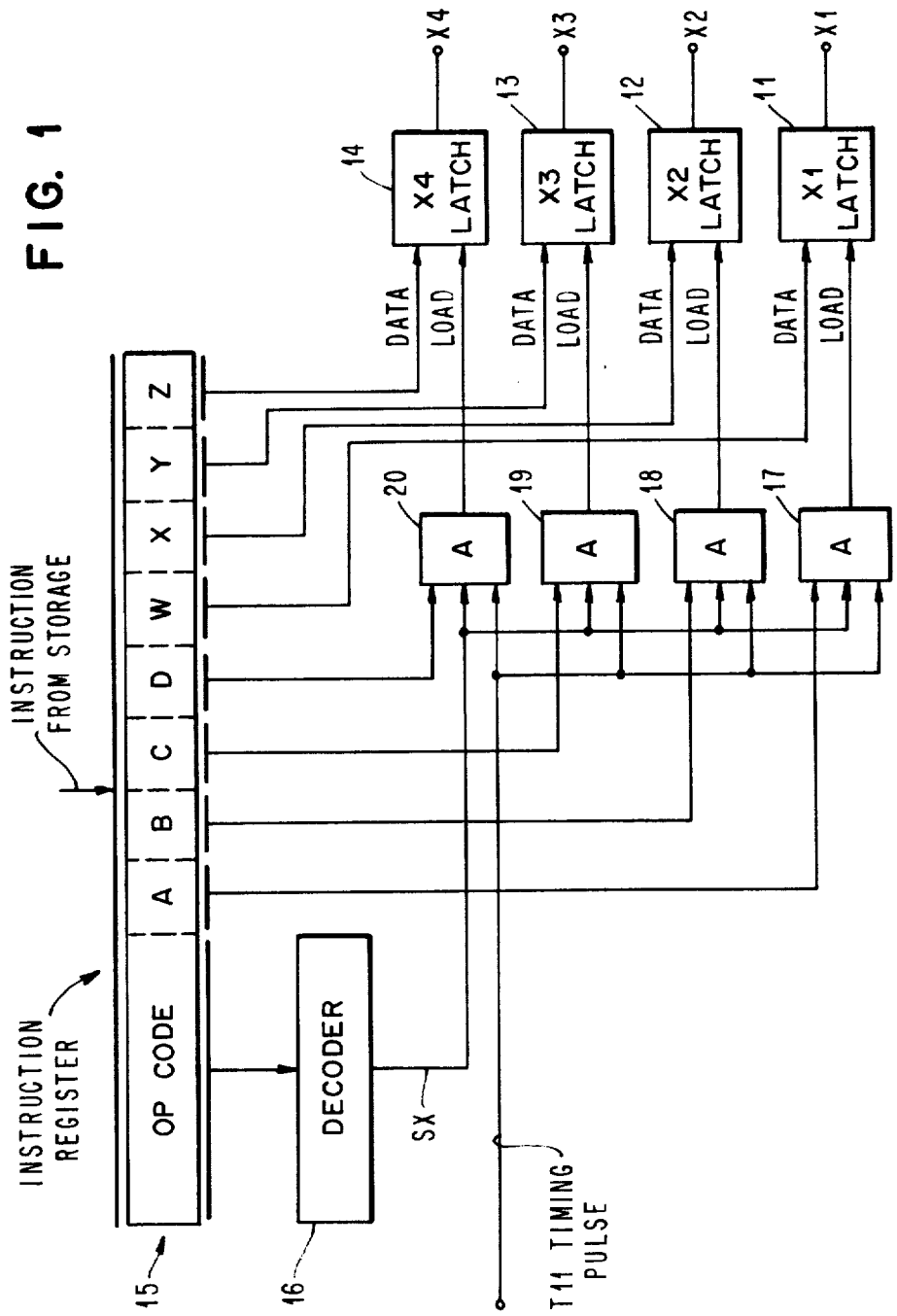
FIG. 1 is a schematic block diagram showing a first embodiment of a programmable control latch mechanism constructed in accordance with the present invention.

Referring to FIG. 1, there is shown a programmable control latch mechanism constructed in accordance with the present invention for providing various control signals for a data processing system. The term "control" is used herein in its broadest sense and, among other things, is clearly intended to include storage addressing and storage area selection control. This programmable control latch mechanism is constructed for use in a data processing system which includes various data flow elements for handling data signals, a storage unit or storage subsystem for storing instructions and data, a basic storage address register for addressing the storage unit, an instruction register for receiving stored instructions from the storage unit and control circuitry coupled to the instruction register for controlling the data flow elements and the reading of instructions from the storage unit.

The programmable control latch mechanism of FIG. 1 includes a plurality of latch circuits 11, 12, 13 and 14. Each of these latch circuits 11, 12, 13 and 14 includes a data input labeled "Data" for receiving a binary data signal, a load input labeled "Load" for receiving a load signal for causing the binary data signal to be loaded into the latch circuit and at least one output for providing a control signal for the data processing system. The outputs are labeled as X1, X2, X3, and X4, respectively. The programmable control latch mechanism also includes circuitry for coupling the data inputs of the latch circuits 11, 12, 13 and 14 to specific ones of a first set of bit positions of an instruction register 15. This first set of bit positions is represented by bit positions W, X, Y, and Z. Bit position W is coupled to the latch circuit 11, bit position X to the latch circuit 12, bit position Y to the latch circuit 13, and bit position Z to the latch circuit 14. These bit positions W, X, Y, and Z provide the binary values which may be loaded into the respective latch circuits and can be thought of as comprising the data field of the operand portion of the new instruction described herein.

The instruction register 15 is a normal and customary part of the data processor and receives one instruction at a time from the main storage unit of the data processor. In order to load one or more of the latch circuits 11, 12, 13 and 14, a new instruction is added to the instruction repertoire of the data processor. For sake of a name, it might be called a "Load Control Latch" instruction. It is assigned a unique predetermined operation code (op code) for distinguishing it from the various other types of instructions in the instruction repertoire. The further bits A, B, C, D, W, X, Y and Z of this Load Control Latch instruction constitute the operand portion of the instruction and provide particular unique "address" and "data" functions associated with the control latch mechanism. In particular, bits A–D constitute an "address" field and bits W–Z constitute a "data" field.

The programmable control latch mechanism of FIG. 1 further includes circuitry coupled to the instruction register 15 and responsive to the occurrence therein of an instruction having the predetermined "Load Control Latch" operation code for supplying a load signal to the load input of one or more of the latch circuits 11, 12, 13, and 14. This circuitry includes decoder circuitry 16 coupled to the instruction register 15 for detecting the occurrence therein of the "Load Control Latch" operation code. When such operation code is detected, a decoder signal SX is produced at the output of the decoder 16.

The circuitry for supplying a load signal also includes a plurality of logic circuits represented by AND circuits 17, 18, 19, and 20. Each of these AND circuits 17, 18, 19, and 20 includes a first input which is coupled to a specific bit position in a second set of bit positions of the instruction register 15. This second set of bit positions is represented by bit positions A, B, C, and D, which, as mentioned, can be thought of as the address field of the operand portion of the new instruction. Bit position A is coupled to the first input of AND circuit 17, bit position B to the first input of AND circuit 18, bit position C to the first input of AND circuit 19, and bit position D to the first input of AND circuit 20. The second inputs of AND circuits 17, 19, 19 and 20 are each coupled to the output of the decoder 16 to receive the decoder signal SX.

As is customary for data processors, the processor with which the control latch mechanism is used operates in repetitive timing cycles sometimes referred to as "machine cycles". Each such machine cycle is subdivided into a series of equal length clock intervals or timing intervals and an individual timing pulse is provided for each such interval. For sake of example herein, it is assumed that the data processor machine cycles are subdivided into twelve clock intervals designated as T0 through T11. One of these timing pulses, for example, the T11 timing pulse occurring at the end of a machine cycle, is supplied to a third input of each of the AND circuits 17, 18, 19, and 20. The advantage of selecting a timing pulse occurring at or near the end of the machine cycle will be discussed hereinafter.

The outputs of the AND circuits 17, 18, 19 and 20 are coupled to the load inputs of different ones of the latch circuits 11, 12, 13, and 14. Thus, the output of AND circuit 17 is coupled to the load input of latch circuit 11, the ouput of AND circuit 18 to the load input of latch circuit 12, the output of AND circuit 19 to the load input of latch circuit 13, and the output of AND circuit 20 to the load input of latch circuit 14.

Any given one of the AND circuits 17, 18, 19, and 20 will supply a load signal to its corresponding latch circuit when three conditions are simultaneously met, namely, when its instruction register bit position in the ABCD set is at the binary one level, the decoder 16 is detecting a "Load Control Latch" instruction (SX=1), and the T11 timing pulse is present. Thus, for example, the AND circuit 17 will supply a load signal to the latch circuit 11 when the bit position A is at the one level, the decoder output SX is at the one level, and the T11 timing pulse line is at the one level. If one or more of these inputs is not at the one level, no load signal will be supplied to the latch circuit 11.

Bit positions A, B, C and D of the Load Control Latch instruction determine which of the latch circuits 11, 12, 13 and 14 will be loaded during any given occurrence of such instruction. The latch circuits to be loaded will have a binary one value in their respective ones of the A, B, C, and D positions. The latch circuits which are not to be loaded will have a binary zero in their corresponding ones of the A, B, C, and D positions. If no load signal is supplied to a latch circuit, then it remains unchanged at its previous value. If a latch circuit is to be loaded, the value loaded therein is determined by the binary value of its corresponding one of the W, X, Y and Z bit positions of the Load Control Latch instruction. Thus, for example, if bit position W contains a binary one value, then a load signal at the output of AND circuit 17 will cause a binary one value to be loaded into the latch circuit 11. Conversely, if bit position W contains a binary zero value, then a load signal appearing at the output of AND circuit 17 will cause a binary zero value to be loaded into the latch circuit 11.

As can be appreciated rom the foregoing, the Load Control Latch instruction format shown in FIG. 1 enables any one, two, three or four of the programmable latch circuits 11, 12, 13 and 14 to be changed and each latch circuit which is to be changed can be changed to either a binary zero value or a binary one value, as desired. This allows for considerable flexibility in the setting and resetting of these programmable control latches 11, 12, 13 and 14. Whenever the programmer wants to change one or more of the latches, he merely inserts into the program a Load Control Latch instruction having the appropriate coding in its A, B, C, D, W, X, Y, and Z bit positions. When during the execution of the program this instruction, in its turn, is supplied to the instruction register 15, the desired latch or latches will be changed in the desired manner.

The output lines X1, X2, X3, and X4 of the latch circuits 11, 12, 13, and 14, respectively, can be used for various control purposes in the data processing system in which these latches are located. They can be used for storage page selection, direct control of external devices or circuits or selection of various internal processor functions. Some specific examples will be given hereinafter.

An advantage of the invention is that different ones of these control latches may be used for completely different control functions in the system. Thus, for example, two of the latches could be used for storage page selection, while a third is used for control of an external device and a fourth is used for control of an internal processor function. Also, since one of these control latches may be changed without knowing or changing the state of the other control latches, different sections of the program controlling a particular control latch are completely independent of programs controlling the other latches.

Figure 2:
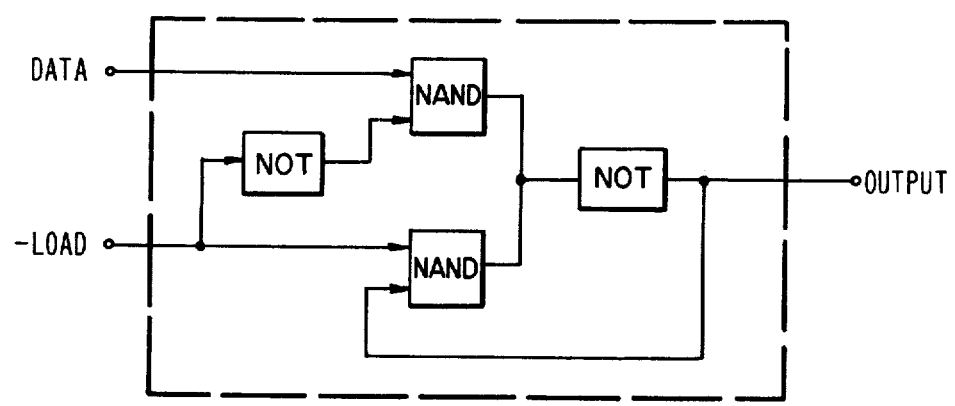
FIGS. 2 and 3 are logic circuit diagrams showing different representative forms of construction which can be used for the latch circuits of FIG. 1.
Figure 3:
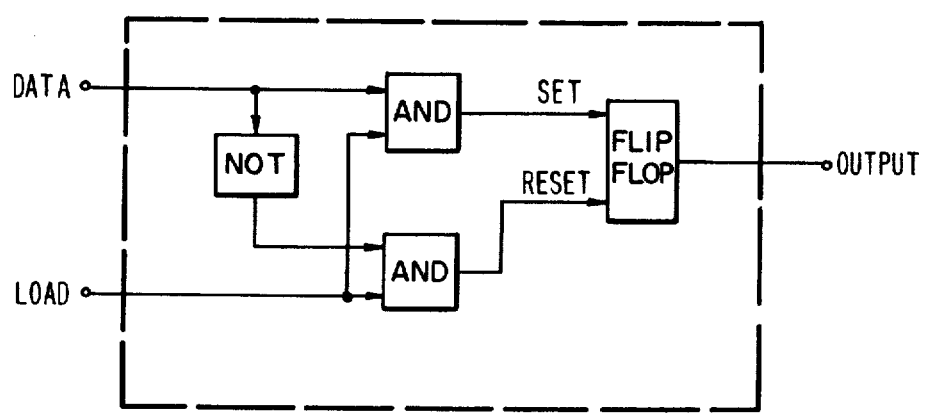

Referring now to FIGS. 2 and 3, there are shown two alternative forms of construction which may be used for each individual latch circuit. The latch circuit shown in FIG. 2 uses NAND and NOT circuits and operates to latch the output line to the same binary value as is present on the data input line at the moment of occurrence of the trailing edge of a negative-going load pulse supplied to the load input line. If this form of construction is used for each of the latch circuits 11, 12, 13, and 14, the negative-going load pulses may be obtained, for example, by using a NAND circuit in place of each of the AND circuits 17, 18, 19, and 20. The latch circuit shown in FIG. 3 includes a flip flop circuit, a pair of AND circuits, and a NOT circuit. In this case, a positive-going load pulse is used at the load input.

Further forms of latch circuits are described in U.S. Pat. No. 3,509,366 and U.S. Pat. No. 3,986,057. Suffice it to say that the term "latch circuit" is used herein to mean any circuit or combination of circuits which provide a bistable characteristic and which includes a data input for receiving a binary signal and a load input for receiving a load signal for causing the binary signal to be loaded into the latch circuit.

Figure 4:
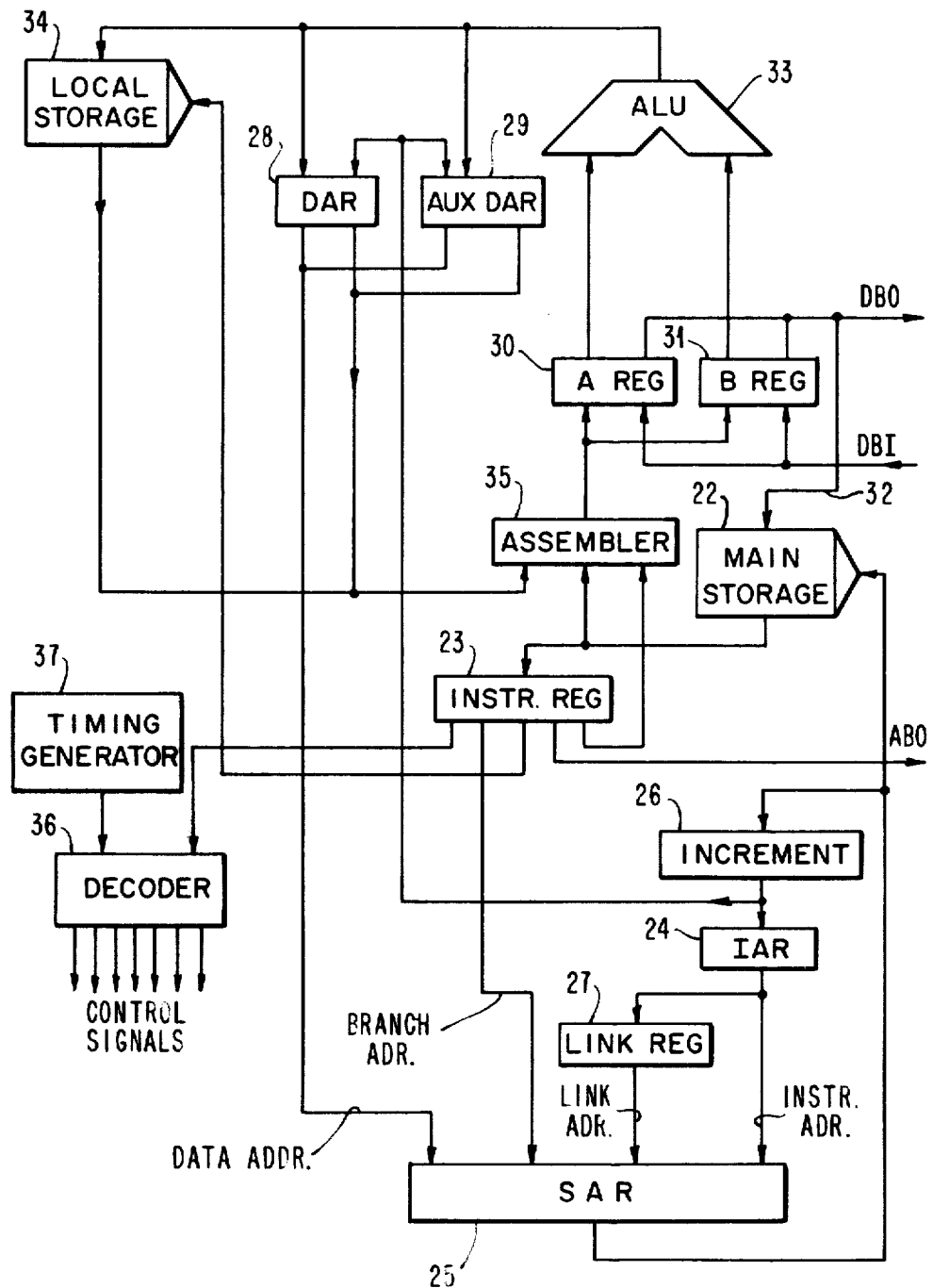
FIG. 4 shows in a somewhat simplified manner the construction of an improved high-performance microprocessor.

Referring to FIG. 4, there is shown the major data flow elements and their manner of interconnection for the case of an improved high-performance microprocessor. With certain minor exceptions, this same general form of microprocessr construction is shown and described in connection with FIG. 17 of U.S. Pat. No. 4,038,642 granted to Messrs. Bouknecht et al on July 26, 1977, and assigned to the International Business Machines Corporation. The microprocessor of FIG. 4 includes a main storage unit 22 for storing program instructions and data. A program is executed by reading its instruction out of the main storage unit 22 in a sequential manner and placing them one at a time into an instruction register 23. This instruction register 23 corresponds to the instruction register 15 of FIG. 1.

Except for branch type instructions, the address of the next instruction resides in an instruction address register (IAR) 24. During execution of the current instruction in the instruction register 23, the next instruction address in IAR 24 is set into a storage address register (SAR) 25 for purposes of addressing the next instruction in the main storage 22. The address in SAR 25 is transferred to the main storage 22 during the execution of the current instruction to provide a prefetching of the next instruction. In other words, the next instruction is fetched during the same cycle that the current instruction is being executed. As the address in SAR 25 is transferred to the main storage 22, it is also incremented by an incrementer 26 and the incremented address is set into IAR 24 to provide therein the address of the next following instruction.

If a branch type instruction is set into the instruction register 23, then a branch address is supplied from the instruction register 23 (or from DAR 28 for a branch via DAR instruction) to SAR 25 for purposes of fetching the next instruction. If a later return to the original branch point is desired, then the contents of IAR 24 will, at this time, be placed in a link register 27 for enabling a later return to the next instruction following the program point from which the branch was made.

For purposes of either reading data from or writing data into the main storage 22, the storage address is, in these cases, obtained from either a data address register (DAR) 28 or an auxiliary data address register (AUX DAR) 29. The storage address from the appropriate one of either DAR 28 or AUX DAR 29 is set into SAR 25 and then transferred from there to the address circuitry of the main storage 22. At the same time, this address is incremented by the incrementer 26 and the incremented address is supplied back to the particular one of DAR 28 and AUX DAR 29 from which the unincremented address was obtained. Thus, DAR 28 (or AUX DAR 29) provides the same function for data that IAR 24 provides for instructions.

The FIG. 4 microprocessor communicates with the external world by way of three primary busses, namely, a Data Bus In (DBI), a Data Bus Out (DBO), and an Address Bus Out (ABO). The Address Bus Out provides a plural-bit code (for example, 8 bits) which is used to select the external register or other circuit element which is to have its data placed on the Data Bus In or, alternatively, which is to receive the data present on the Data Bus Out.

Incoming data received on the Data Bus In is set into an A register 30 and a B register 31. From there, the incoming data may be supplied directly to the main storage 22 via bus 32 or it may instead be supplied by way of an Arithmetic and Logic Unit (ALU) 33 to a local storage unit 34. Local storage 34 is comprised of a stack of addressable working registers for temporarily holding the data or other operands during their manipulation by the microprocessor. Local storage 34 is addressed by way of an appropriate address field or fields contained in the instruction residing in the instruction register 23. For a typical register to register operation, the instruction will include two local storage address fields, one for each of the two operands which are to be involved in the operation.

The data or other operands contained in local storage 34 are read out by way of an assembler circuit 35 and are set into one or the other of A register 30 and B register 31. For the case of an arithmetic add instruction, for example, the contents of the A register 30 are added to the contents of B register 31 by the ALU 33 and the results are stored back into the local storage 34. Alternatively, by way of the appropriate instruction, the contents of A register 30 and B register 31 can be placed on the Data Bus Out for transfer to the appropriate register in the hardware to which the microprocessor is connected. As a further alternative, the contents of A register 30 and B register 31 may be transferred by means of the appropriate instruction to the main storage 22 via storage bus 32.

When data is read out of the main storage 22, it is supplied by way of assembler 35 to the A register 30 and the B register 31. From there it may be supplied by way of ALU 33 to the local storage 34 or alternatively it may be placed on the Data Bus Out from the A register 30 and the B register 31.

Each instruction set into the instruction register 23 includes an Operation Code (OP Code) field. This OP Code field is supplied to a decoder 36 which also receives the T0–T11 timing pulses from a timing generator 37. The decoder 36 decodes the OP Code and issues the appropriate control signals at the appropriate moments to the various data flow control gates (not shown) and to the appropriate registers for obtaining the desired movement of data or other operands for that particular instruction. When appropriate, decoder 36 also supplies the appropriate signals to ALU 33 for telling it to add or subtract or perform some other logical function.

Figure 5:
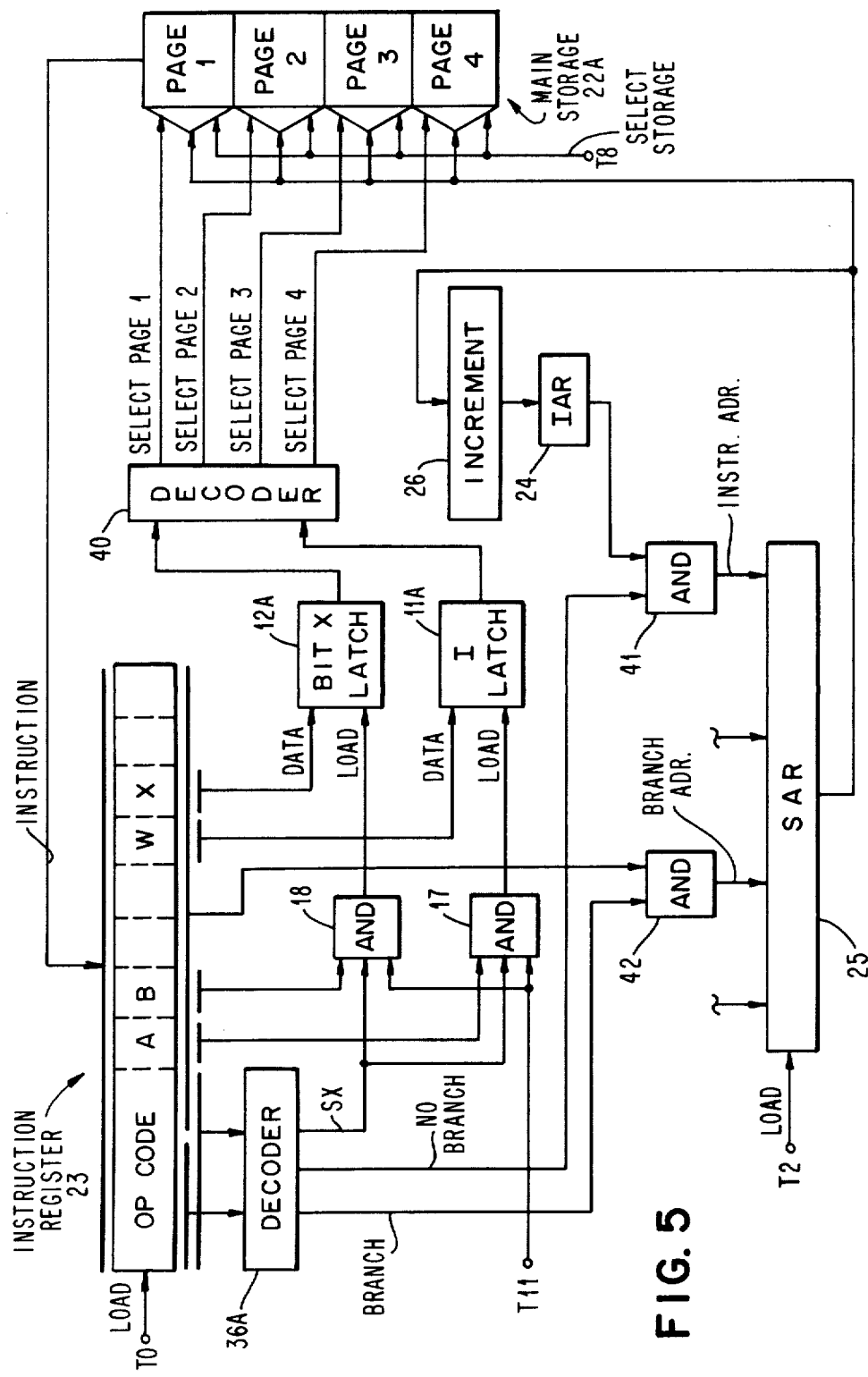
FIG. 5 shows how the present invention can be applied to the microprocessor of FIG. 4 to enable the addressing of four times as much main storage as is possible in FIG. 4.

Referring to FIG. 5, there is shown how the programmable control latch mechanism of FIG. 1 may be applied to the microprocessor of FIG. 4 to extend the storage addressing range of the microprocessor to make it four times as great as in FIG. 4. In particular, the main storage unit or main storage subsystem 22A of FIG. 5 includes four storage areas, designated as Page 1, Page 2, Page 3 and Page 4, each of which has a storage capacity corresponding to that of the main storage unit 22 of FIG. 4. For sake of example, it is assumed that the basic storage address register 25 is a twelve-bit storage register for holding the twelve bits contained in the storage address field of those instructions which include a storage address field. In other words, the microprocessor is assumed to have a basic storage addressing capability of twelve bits. Thus, in this example, IAR 24 and DAR 28 are also twelve-bit registers. This basic twelve bit address can address a storage range of from zero to 4095 bytes, wherein each byte includes eight bits. Thus, in the present example, each page in the main storage 22A includes a storage capacity of 4096 bytes and this capacity corresponds to the maximum storage addressing capability of the basic storage address register 25.

To obtain the fourfold increase in storage addressing capability, it is necessary to employ two of the programmable control latches of FIG. 1, these being identified as the I latch 11A and the Bit X latch 12A in FIG. 5. These correspond, for example, to the X1 latch 11 and the X2 latch 12 of FIG. 1. The loading of these FIG. 5 latches 11A and 12A are respectively controlled by the AND circuits 17 and 18, which are the same as the correspondingly numbered AND circuits in FIG. 1. The decoder 36A can be thought of as being part of the decoder 36 of FIG. 4, except that it includes the further capability of the decoder 16 of FIG. 1 in that it can produce an SX decoder output signal when a Load Control Latch OP Code is detected in the instruction register 23.

The programmable control latches 11A and 12A provide address control signals and the microprocessor is provided with storage area selection circuitry coupled to the main storage subsystem 22A and responsive to these address control signals for determining the particular storage area or storage page which is accessed. This storage area selection circuitry includes a decoder 40 which decodes the two-bit code provided by the two latch circuit output lines and activates a particular one of its four page select output lines. These page select output lines from the decoder 40 run to and select different ones of the page areas in the main storage 22A. Since only one of the page select lines can be activated at any given moment, only one of the four possible storage areas can be accessed at such moment. In other words, the storage address in SAR 25 is effective only for the particular storage page for which the page select line is activated. Thus, for example, if the outputs of latches 11A and 12A provide a two-bit code of 00, then the Select Page One line is activated and the address in SAR 25 is transferred to the Page 1 address circuitry. If, on the other hand, the outputs of latches 11A and 12A provide a code value of 01, then the Select Page Two line is activated and the address in SAR 25 is transferred to the Page Two address circuitry. Similar considerations apply to Pages 3 and 4 for the other possible latch output codes of 10 and 11.

When it is desired to use different storage pages during the execution of a program, it is merely necessary to insert Load Control Latch instructions into the program at the appropriate points therein with the A, B, W, and X bit positions in such instructions having the proper coding for selecting the desired storage page. When used solely for storage page selection purposes, the Load Control Latch instruction might be more appropriately called a "Select Storage Page" instruction.

The main storage addressing capability of the microprocessor can be further increased by using three or four programmable control latches instead of the two shown in FIG. 5. The use of three control latches enables the selection of up to eight pages of main storage, while the use of four control latches enables the selection of up to sixteen pages of main storage. In such cases, the third and fourth control latches and their associated AND circuits are connected in the manner shown in FIG. 1 with the outputs of all three or four latch circuits running to an expanded decoder circuit 40 capable of decoding either a three-bit code or a four-bit code and correspondingly having either 8 or 16 page select output lines.

The advantage of causing the actual loading of the control latches to occur at or near the end of the machine cycle during which the Load Control Latch instruction is resident in the instruction register will now be explained. This explanation will be given for the FIG. 5 example wherein the actual loading of either or both of the control latches 11A and 12A is controlled by the T11 clock pulse which is supplied to the third input of the AND circuits 17 and 18, this T11 timing pulse being assumed to be the last timing pulse in the machine cycle for the Load Control Latch instruction. The purpose of using a timing pulse occurring at or near the end of the machine cycle to set the control latches is to allow for completion of one more storage cycle during which a branch instruction may be set into the instruction register 23 so as to supply a branch address to the storage address register 25 before the control latch change takes effect. This enables not only the page to be changed but also the address in the page to be changed at the same time. In other words, both changes become effective at the same time for the same storage reference even though they were changed by two sequential instructions.

Figure 6:
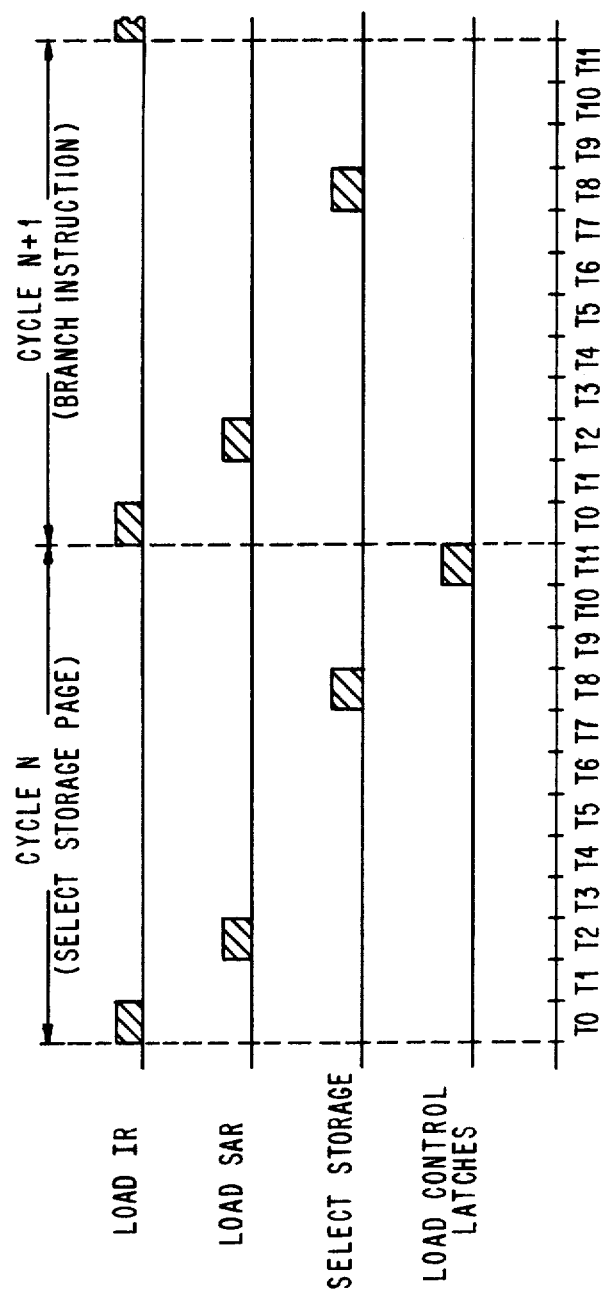
FIG. 6 is a timing diagram used in explaining the operation of the FIG. 5 embodiment.

With reference to the timing diagram of FIG. 6, cycle N represents the machine cycle during which the Load Control Latch instruction is resident in the instruction register 23, while cycle N+1 represents the following cycle during which the branch instruction is resident in the instruction register 23. As indicated by the load IR (instruction register) pulse of cycle N, the Load Control Latch (Select Storage Page) instruction is loaded into the instruction register 23 during timing interval T0. As indicated by the load SAR pulse of cycle N, the contents of IAR 24 are loaded into the storage address register 25 at time T2, it being assumed that the decoder 36A is supplying the proper decoder output for activating the control gate represented by AND circuit 41. This address from IAR 24 is the address of the next instruction which, in this case, is the branch instruction desired for cycle N+1. As indicated by the select storage pulse of cycle N, the address in SAR 25 is transferred to the address circuitry of the main storage 22A at time T8. This commences the accessing of the main storage 22A and shortly thereafter the addressed instruction appears at the output of the main storage 22A. Thus, the next instruction (to be executed during cycle N+1) is prefetched during the execution of the current instruction during cycle N. After having thus carried the fetching of the next instruction to the point where it cannot be affected, then and only then are one or both of the control latches 11A and 12A actually loaded. As indicated by the load control latches pulse for cycle N, this occurs at time T11, which is at the very end of cycle N. Thus, the result of changing the control latches does not take effect until some later point in the next ensuing machine cycle. Thus, the branch instruction for cycle N+1 is obtained from the same storage page as was the Load Control Latch instruction for cycle N.

As indicated by the load IR pulse of cycle N+1, the branch instruction is set into the instruction register 23 at time T0 of cycle N+1. The decoder 36A recognizes this to be a branch instruction and activates its "Branch" output line and deactivates its "No Branch" output line. This activates the control gate represented by AND circuit 42 which, in turn, enables the branch storage address contained in the branch instruction to be passed to the input of the storage address register 25. As indicated by the load SAR pulse of cycle N+1, this branch address is set into SAR 25 at time T2. This branch address is thereafter transferred to the address circuitry of the main storage 22A at time T8, as indicated by the select storage pulse of cycle N+1. By this point in time, however, the new setting of the control latches 11A and 12A has taken effect so that this branch address is transferred to the address circuitry for the newly selected page in the main storage 22A. Thus, not only is the page changed, but, if desired, so also is the byte address for the new page, with both changes taking effect at the same time, namely, during the storage reference commencing at time T8 of cycle N+1. Thus, the instruction to be executed during cycle N+2 (not shown) is from the newly selected storage page and is prefetched during cycle N+1.

Copending U.S. patent application Ser. No. 866,425, filed Jan. 3, 1978, in the name of Jerry D. Dixon and entitled "Return And Link Mechanism" and assigned to International Business Machines Corporation describes in considerable detail a microprocessor of the type shown in FIG. 4. This copending application also shows latches corresponding to the I latch 11A and the Bit X latch 12A of FIG. 5 and describes their use for extending the main storage addressing range. It does not, however, show the mechanism described herein for setting or resetting the latches. It instead says that the I latch is set by a "Set Instruction High" (SIH) instruction and is reset by a "Set Instruction Low" (SIL) instruction and that the Bit X latch is set by an SXN instruction and is reset by an SXF instruction. It does not show or describe the AND circuits 17 and 18 or the use of a special instruction having A, B, W and X bits.

Figure 7:
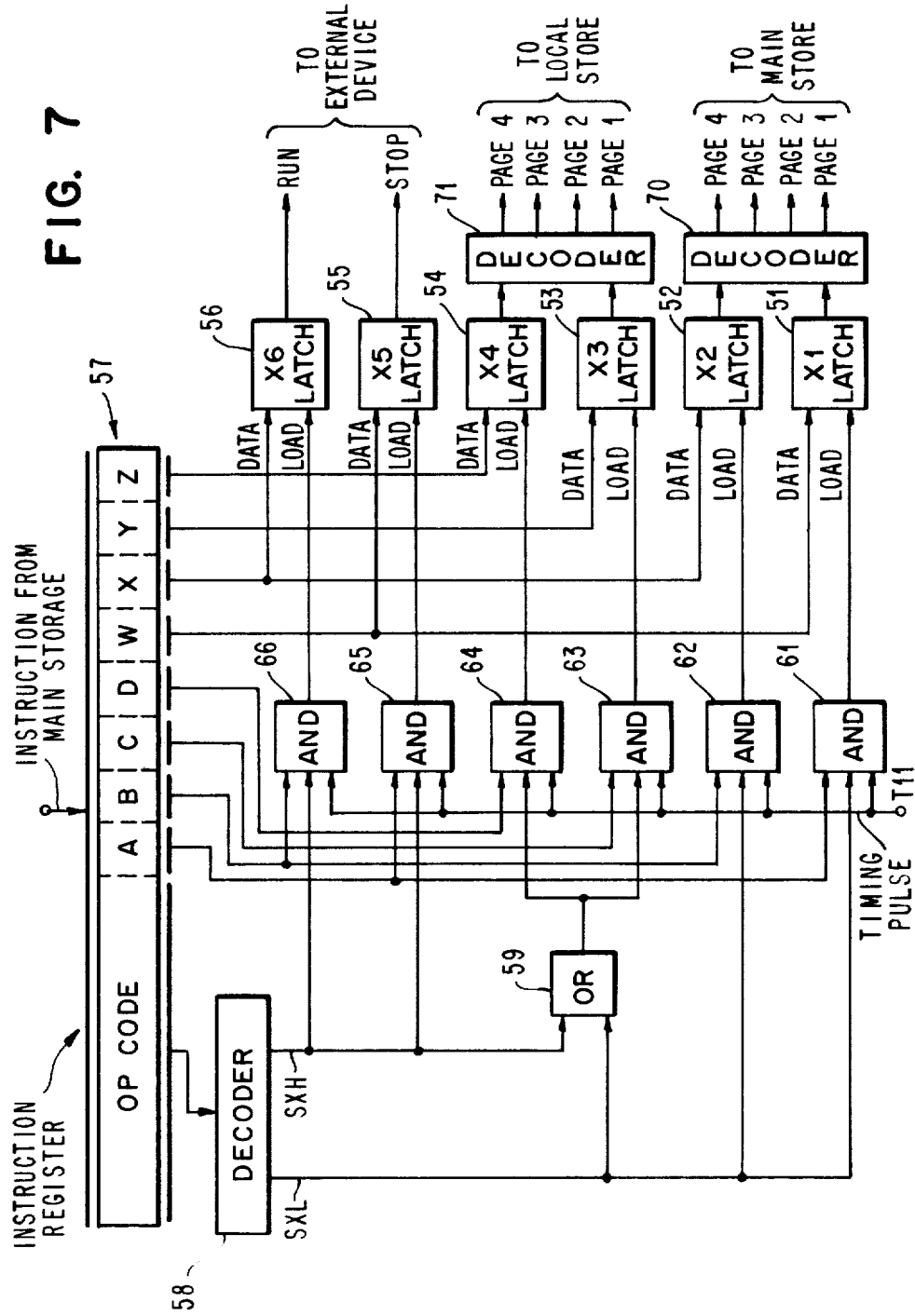
FIG. 7 shows a further embodiment of a programmable control latch mechanism constructed in accordance with the present invention.

Referring now to FIG. 7, there is shown a further embodiment of the invention wherein six programmable control latches 51–56 may be programmed by supplying the appropriate Load Control Latch instructions to the instruction register 57. In this case, Load Control Latch instructions having two different unique OP codes are utilized. One of these OP codes denotes a "load first set" instruction and is detected by a decoder 58 to produce a decoder signal on the decoder output line SXL. The second of these unique OP codes denotes a "load second set" instruction and is detected by the decoder 58 to produce a decoder signal on the decoder output line SXH.

In this embodiment, the control latches 51–56 are divided into two overlapping sets. The first set is comprised of latches 51–54 and the second set is comprised of latches 53–56. The decoder output for the SXL OP code is supplied to the second inputs of AND circuits 61–64 (the latter two via OR circuit 59) to enable any one or more of the four latches 51–54 in the first set to be loaded, depending on the binary values residing in the A, B, C and D bit positions of the instruction. In a similar manner, the decoder output for the SXH OP code is supplied to a second set of AND circuits 63–66 (the first two via OR circuit 59) for enabling one or more of the latch circuits 53–56 in the second set to be loaded, depending, as before, on the binary values contained in the A, B, C and D bit positions of the instruction. The particular binary value loaded into any given latch is determined by the binary value in the particular one of the W, X, Y and Z bit positions of the instruction register to which its data input is connected. The timing for the loading of all of the latch circuits is controlled by the T11 timing pulse which is supplied to all six of the AND circuits 61–66.

Also shown in FIG. 7 is an example of the various different uses which can be made of the programmable control latches 51–56. In the example shown, latches 51 and 52 are used for main storage page selection purposes. As such, their outputs are connected to a decoder 70, the four page selection output lines of which run to a main storage subsystem such as the main storage subsystem 22A of FIG. 5.

In the example shown, control latches 53 and 54 are used for local storage page selection purposes. As such, their outputs are connected to a decoder 71 and the four page select output lines of the decoder 71 run to the address circuitry of a local storage unit such as the local storage 34 of FIG. 4. In this case, the local storage 34 would be expanded to four times its original size. The original size may have been such as to include, for example, 32 separately addressable working registers, in which case such set of 32 registers can be thought of as comprising a local storage "page". With the example shown in FIG. 7, four such local storage pages can be provided, with the page that is in use at any given moment being determined by the binary states of the control latches 53 and 54. Such a pageable local storage structure enables different local storage pages to be provided for different operations in the microprocessor with the end result being to reduce the overall data processing time.

In the example shown in FIG. 7, control latches 55 and 56 are used to provide control signals for the direct control of one or more external devices which may be coupled to or associated with the microprocessor. Alternatively, the control latches 55 and 56 could instead be used to control the selection of internal processor functions. For example, in the FIG. 4 microprocessor, these control latches 55 and 56 could be used to control the selection of either the data address register 28 or the auxiliary data address register 29 for purposes of supplying a data address to SAR 25.

For the example shown in FIG. 7, the Load Control Latch instruction having the SXL OP code is used to change either or both of the main storage page and the local storage page. The Load Control Latch instruction having the SXH OP code, on the other hand, is used to change either or both of the local storage page and the control signals being supplied to the external device.

The example of FIG. 7 is intended to illustrate the flexibility and versatility of the programmable control latch mechanism provided by this invention. Various other uses to which the programmable control latches can be put are sure to come to the mind of those skilled in the art and need not be belabored herein. Suffice it to say that the present invention provides an advantageous mechanism of relatively simple and straightforward construction for extending or supplementing the control and addressing capabilities of various types of data processors.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In a data processing system which includes various data flow elements for handling data signals, a storage unit for storing instructions, an instruction register for receiving stored instructions from the storage unit and control circuitry coupled to the instruction register for controlling the data flow elements and the reading of instructions from the storage unit, a programmable control latch mechanism comprising:
    a latch circuit having a data input for receiving a binary data signal, a load input for receiving a load signal for causing the binary data signal to be loaded into the latch circuit and at least one output for providing a control signal for the data processing system;
    circuitry for coupling the data input of the latch circuit to a predetermined bit position of the instruction register;
    and circuitry coupled to the instruction register and responsive to the occurrence therein of an instruction having a predetermined operation code for supplying a load signal to the load input of the latch circuit, the predetermined bit position of the instruction determining the binary value loaded into the latch circuit.

2. In a data processing system which includes various data flow elements for handling data signals, a storage unit for storing instructions, an instruction register for receiving stored instructions from the storage unit and control circuitry coupled to the instruction register for controlling the data flow elements and the reading of instructions from the storage unit, a programmable control latch mechanism comprising:
    a plurality of latch circuits, each having a data input for receiving a binary data signal, a load input for receiving a load signal for causing the binary data signal to be loaded into the latch circuit and at least one output for providing a control signal for the data processing system;
    circuitry for coupling the data inputs of the latch circuits to different ones of a first set of bit positions of the instruction register;
    decoder circuitry coupled to the instruction register for detecting the occurrence therein of an instruction having a predetermined operation code;
    and a plurality of logic circuits having first inputs coupled to different ones of a second set of bit positions of the instruction register, second inputs coupled to the decoder circuitry and outputs coupled to the load inputs of different ones of the latch circuits for enabling the instruction register bit positions in the second set to determine which latch circuits are loaded when the predetermined operation code is detected.

3. In a data processing system which includes a storage subsystem for storing instructions and data, a basic storage address register for addressing the storage subsystem and an instruction register for receiving stored instructions from the storage subsystem, a storage addressing extension mechanism for extending the storage addressing range beyond that addressable by the basic storage address register and comprising;
    first and second storage areas included in the storage subsystem, the sum total storage capacity of such areas being greater than the maximum storage addressing capability of the basic storage address register;
    a latch circuit having a data input for receiving a binary data signal, a load input for receiving a load signal for causing the binary data signal to be loaded into the latch circuit and at least one output for providing a storage area selection signal;
    circuitry for coupling the data input of the latch circuit to a predetermined bit position of the instruction register;
    circuitry coupled to the instruction register and responsive to the occurrence therein of an instruction having a predetermined operation code for supplying a load signal to the load input of the latch circuit, the predetermined bit position of the instruction determining the binary value loaded into the latch circuit;
    and storage area selection circuitry coupled to the storage subsystem and responsive to the binary state of the latch circuit for determining which of the two storage areas is accessed.

4. In a data processing system which includes a storage subsystem for storing instructions and data, a basic storage address register for addressing the storage subsystem and an instruction register for receiving stored instructions from the storage subsystem, a storage addressing extension mechanism for extending the storage addressing range beyond that addressable by the basic storage address register and comprising;

a plurality of storage areas included in the storage subsystem, each such storage area having a storage capacity corresponding to the maximum storage addressing capability of the basic storage address register;

a plurality of latch circuits, each having a data input for receiving a binary data signal, a load input for receiving a load signal for causing the binary data signal to be loaded into the latch circuit and at least one output for providing an address control signal;

circuitry for coupling the data inputs of the latch circuits to different ones of a first set of bit positions of the instruction register;

decoder circuitry coupled to the instruction register for detecting the occurrence therein of an instruction having a predetermined operation code;

a plurality of logic circuits having first inputs coupled to different ones of a second set of bit positions of the instruction register, second inputs coupled to the decoder circuitry and outputs coupled to the load inputs of different ones of the latch circuits for enabling the instruction register bit positions in the second set to determine which latch circuits are loaded when the predetermined operation code is detected;

and storage area selection circuitry coupled to the storage subsystem and responsive to the address control signals appearing at the latch circuit outputs for determining the particular storage area which is accessed.

5. In a data processing system which includes various data flow elements for handling data signals, a storage unit for storing instructions, an instruction register for receiving stored instructions from the storage unit and control circuitry coupled to the instruction register for controlling the data flow elements and the reading of instructions from the storage unit, a programmable control latch mechanism comprising:

at least three latch circuits, each having a data input for receiving a binary data signal, a load input for receiving a load signal for causing the binary data signal to be loaded into the latch circuit and at least one output for providing a control signal for the data processing system;

circuitry for coupling the data inputs of a first and second of these latch circuits to a first predetermined bit position of the instruction register and for coupling the data input of a third of these latch circuits to a second predetermined bit position of the instruction register;

decoder circuitry having first and second outputs and coupled to the instruction register for providing a decoder signal at the first output when an instruction having a first predetermined operation code is detected in the instruction register and for providing a decoder signal at the second output when an instruction having a second predetermined operation code is detected in the instruction register;

a first logic circuit having one input coupled to a third predetermined bit position of the instruction register and another input coupled to the first decoder output for supplying a load signal to the first latch circuit when the first predetermined operation code is detected and the third predetermined bit position contains a particular binary value;

a second logic circuit having one input coupled to the third predetermined bit position of the instruction register and another input coupled to the second decoder output for supplying a load signal to the second latch circuit when the second predetermined operation code is detected and the third predetermined bit position contains a particular binary value;

and a third logic circuit having one input coupled to a fourth predetermined bit position of the instruction register and another input coupled to both of the first and second decoder outputs for supplying a load signal to the third latch circuit when either the first or the second predetermined operation code is detected and the fourth predetermined bit position contains a particular binary value.

* * * * *